3,193,549
10-[(1-PIPERIDYL)LOWER-ALKYL]-TRIFLUORO-
METHYLPHENOTHIAZINES
Bernard L. Zenitz, Colonie, N.Y., assignor to Sterling Drug Inc., New York, N.Y., a corporation of Delaware
No Drawing. Filed July 7, 1958, Ser. No. 746,615
9 Claims. (Cl. 260—243)

This invention relates to new trifluoromethylphenothiazinylalkyl amines and to methods for the preparation thereof.

10 - [(1 - piperidyl)lower-alkylene]phenothiazines unsubstituted in the piperidine ring are known. The invention resides in the concept of such known types of phenothiazines wherein the phenothiazine nucleus is substituted by a trifluoromethyl radical and the piperidine ring is substituted by a hydroxy or hydroxy-lower-alkyl radical, or by said radicals when esterified, and salts, thereof, whereby new and useful compounds are obtained. The piperidine ring can be further substituted by one or more lower-alkyl radicals. The lower-alkyl radicals can contain from one to about four carbon atoms and can be on the same or on different carbon atoms of the piperidine ring.

A preferred aspect of the invention relates to compounds having the formula

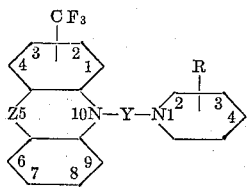

(I)

wherein Y represents a lower-alkylene radical, Z represents a sulfur atom, the sulfoxide group or the sulfone group and R represents a hydroxy, acyloxy, hydroxy-lower-alkyl or acyloxy-lower-alkyl radical. The trifluoromethyl radical can be in any of the four available positions in the benzene ring, although the 2- and 4-positions are the preferred ones.

In the above general Formula I, the alkylene bridge Y has from two to about five carbon atoms, can be straight or branched, and is such that the nitrogen atoms of the phenothiazine and piperidine moieties are separated by at least two carbon atoms. Thus Y includes such groups at ethylene, $CH_2CH_2$; propylene, $CH_2CH_2CH_2$; 1 - methylethylene, $CH(CH_3)CH_2$; 2 - methylethylene, $CH_2CH(CH_3)$; butylene, $CH_2CH_2CH_2CH_2$; 1-methyl-propylene, $CH(CH_3)CH_2CH_2$; pentylene, $CH_2CH_2CH_2CH_2CH_2$ and the like. A particularly preferred group of compounds is that in which Y is propylene, $CH_2CH_2CH_2$.

In the above Formula I, the group R represents a hydroxy, acyloxy, hydroxy-lower-alkyl or acyloxy-lower-alkyl radical. The hydroxy and acyloxy radicals can be in the 3- or 4-position of the piperidine ring, and the hydroxy-lower-alkyl and acyloxy-lower alkyl radicals can be in the 2-, 3- or 4-position of the piperidine ring, i.e., in any of the three possible positions. A particularly preferred group of compounds is that in which R is in the 4-position of the piperidine ring. The acyloxy radical is one derived from a hydrocarbon carboxylic acid, preferably having from one to about ten carbon atoms, and thus includes such radicals as formyloxy, acetoxy, propionyloxy, butyryloxy, isobutyryloxy, caproyloxy, benzoyloxy, p-toluyloxy, cinnamoyloxy, trimethoxybenzoyloxy, cyclohexenoyloxy, acryloyloxy and the like.

When R represents a hydroxy-lower-alkyl or acyloxy-lower-alkyl radical, it stands for a lower-alkyl radical which can be straight or branched and contains from one to about five carbon atoms, and bears a hydroxy or acyloxy radical attached to a carbon atom in any available position in the side chain respective to the piperidine ring. The acyloxy portions of the acyloxy-lower-alkyl radicals are of the same type as those described above. Thus R includes such radicals as hydroxymethyl, acetoxymethyl, 1-hydroxyethyl, 2-hydroxyethyl, 2-propionyloxyethyl, 3-hydroxypropyl, 5-hydroxypentyl, and the like.

The compounds of the invention are prepared by reacting a trifluoromethylphenothiazine with a hydroxypiperidine, hydroxy-lower-alkyl-piperidine or ester thereof in which either the phenothiazine or the piperidine bears attached to nitrogen a halo-lower-alkyl radical. A preferred method comprises heating a hydroxypiperidine or hydroxy-lower-alkylpiperidine with a 10-(halo-lower-alkyl)-trifluoromethylphenothiazine at a temperature between about 50° C. and 150° C. in the presence of an acid-acceptor. The reaction is preferably carried out in an organic solvent, inert under the conditions of the reaction, such as anhydrous ethanol, benzene, xylene, and the like. The purpose of the acid-acceptor is to take up the hydrogen halide which is split out during the course of the reaction. The acid-acceptor is a basic substance which forms water-soluble by-products easily separable from the main product of the reaction, and includes such substances as alkali metal salts of weak acids, e.g., sodium carbonate, potassium carbonate, sodium acetate, sodium alkoxides, sodium amide, and the like. The acid-acceptor can also be in the form of an excess quantity of hydroxypiperidine or hydroxy-lower-alkyl-piperidine.

The reaction of a 10-(halo-lower-alkyl)-trifluoromethylphenothiazine with a hydroxypiperidine or hydroxy-lower-alkylpiperidine takes place under relatively mild conditions, a preferred, specific method comprising heating the reactants in boiling ethanol solution in the presence of anhydrous sodium carbonate. The reaction of a trifluoromethylphenothiazine with an N-(halo-lower-alkyl)-hydroxypiperidine or -hydroxy-lower-alkylpiperidine requires somewhat more vigorous conditions, a preferred method comprising heating the reactants in boiling xylene in the presence of sodium amide.

The compounds of Formula I wherein R represents an acyloxy or acyloxy-lower-alkyl radical are preferably produced by esterification of the corresponding compounds wherein R represents a hydroxy or hydroxy-lower-alkyl radical, for instance, by heating the hydroxy compound with the appropriate acid anhydride or acid halide in pyridine solution. It is possible, however, to prepare the acyloxy compounds directly by condensation of a 10 - (halo-lower-alkyl)-trifluoromethylphenothiazine with an acyloxypiperidine or acyloxy-lower-alkylpiperidine, although it is preferable to use an excess of the piperidine reactant as the acid-acceptor rather than sodium carbonate or the like in order to avoid partial cleavage of the ester linkage.

The compounds of Formula I wherein Z is SO or $SO_2$ can be prepared by reacting a 10-(halo-lower-alkyl)-trifluoromethylphenothiazine 5-oxide or 10-(halo-lower-alkyl)-trifluoromethylphenothiazine 5,5-dioxide, respectively, with a hydroxypiperidine or hydroxy-lower-alkyl-piperidine or esters thereof. The intermediate 10-(halo-lower-alkyl)-trifluoromethylphenothiazine 5-oxides and 10-(halo-lower-alkyl)-trifluoromethylphenothiazine 5,5-dioxides can be prepared by oxidizing the parent 10-(halo-lower-alkyl)-trifluoromethylphenothiazines with one or with two molar equivalents of hydrogen peroxide, respectively, in an appropriate organic solvent. In preparing the 5-oxide, it is preferred that the reaction be carried out at low temperatures in the range 0–25° C. in ethanol whereas preparation of the 5,5-dioxide is preferably conducted at more elevated temperatures in the range 50°–115° C. in glacial acetic acid.

Alternatively, the compounds of Formula I wherein Z represents SO or $SO_2$ may be prepared directly from the compounds of Formula I wherein Z represents S by oxidation with hydrogen peroxide as before. In this latter procedure, further oxidation of the piperidyl nitrogen atom to the N-oxide may occur, and in such case it is necessary to reduce the N-oxide group back to the tertiary amine with an appropriate reducing agent as, for example, sodium bisulfite.

The intermediate 10-(halo-lower-alkyl)-trifluoromethylphenothiazines can be prepared by reacting the 10-lithio derivative of a trifluoromethylphenothiazine with the appropriate halo-lower-alkyl p-toluene-sulfonate. The trifluoromethylphenothiazines are in turn prepared by known methods, e.g., see Charpentier et al., Compt. rend., 235, 59–60 (1952), Evans et al., J. Chem. Soc., 1935, 1263–4 (1935), and Massie, Chem. Rev., 54, 797 (1954).

The acid-addition or quaternary ammonium salts of the compounds of Formula I are water-soluble and are the form in which the compounds are conveniently prepared for use physiologically. Pharmacologically acceptable salts are salts whose anions are innocuous to the animal organism in effective doses of the salts, so that beneficial physiological properties inherent in the free basis are not vitiated by side-effects ascribable to the anions; in other words, the latter do not substantially affect the pharmacological properties inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of esters of inorganic acids or organic sulfonic acids having a molecular weight less than about 200 to the free base form of the compounds. Preferred esters are those derived from lower-alkyl, alkenyl or aralkyl esters of inorganic acids or organic sulfonic acids. The alkyl, alkenyl or aralkyl esters so used include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl ester in an organic solvent. Heating can be used to facilitate the reaction, although salt formation usually takes place readily at room temperature. The quaternary ammonium salt separates directly or can be obtained by concentration of the solution.

Although pharmacologically acceptable salts are preferred, those having toxic anions are also useful. All acid-addition salts are useful as intermediates in purification of the free bases, and toxic acid-addition and quaternary ammonium salts are also useful as intermediates in preparing pharmacologically acceptable salts by ion exchange procedures.

The structures of the compounds of the invention have been established by chemical analysis and by the processes for their preparation, which can only lead to compounds of the assigned structures.

The following examples will further illustrate the invention, without the latter being limited thereto.

PREPARATION OF INTERMEDIATES

Example 1

10-(2-chloroethyl)-2-trifluoromethylphenothiazine.—Lithium wire (2.8 g., 0.4 mole) and 250 ml. of absolute ether were stirred in a nitrogen atmosphere while cooling externally with a methanol-Dry Ice bath. A solution of 27.4 g. (0.2 mole) of n-butyl bromide in 50 ml. of absolute ether was added drop-wise over a period of about one hour and fifteen minutes while maintaining the temperature around −10° C. The mixture was stirred for an additional forty-five minutes. 2-trifluoromethylphenothiazine (48.1 g., 0.18 mole) was then added in portions over a ten minute period while maintaining the temperature around −15° C. The temperature was then maintained around 0° C. while stirring for thirty minutes. The mixture was once more cooled to −15° C., and a solution of 51.7 g. (0.22 mole) of 2-chloroethyl p-toluene-sulfonate in 50 ml. of dry ether was added over a period of one hour and thirty minutes. The mixture was stirred an additional hour at −15° C. and then permitted to warm to room temperature. The mixture was then treated with 125 ml. of water added over a period of ten minutes. The mixture was filtered, the ether layer separated and washed several times with water and the ether solution dried over sodium sulfate. The mixture was filtered, the ether evaporated and the residual dark oil dissolved in 100 ml. of benzene and 300 ml. of hexane. The solution was then chromatographed on a column of alumina (4 cm. x 51 cm.), and eluted with 1750 ml. of a 1:3 solution of benzene and hexane. Removal of the solvent gave an oil which solidified on short standing. The crude product was recrystallized several times from hexane to give 30.7 g. of 10-(2-chloroethyl)-2-trifluoromethylphenothiazine, M.P. 80.4–82.4° C. (corr.).

Analysis.—Calcd. for $C_{15}H_{11}ClF_3NS$: S, 9.72; Cl, 10.77. Found: S, 9.63; Cl, 10.75.

Example 2

10-(3-chloropropyl)-2-trifluoromethylphenothiazine was prepared from 48.1 g. (0.18 mole) of 2-trifluoromethylphenothiazine, 54.7 g. (0.22 mole) of 3-chloropropyl p-toluenesulfonate, 2.8 g. (0.4 mole) of lithium wire and 27.4 g. (0.2 mole) of n-butyl bromide, according to the manipulative procedure described above in Example 1. The crude product was eluted from the alumina column with 4.3 liters of hexane. The solvent was evaporated and the residual solid recrystallized twice from hexane to give 41.2 g. of 10-(3-chloropropyl)-2-trifluoromethylphenothiazine, M.P. 74.0–76.6° C. (corr.).

Analysis.—Calcd. for $C_{16}H_{13}ClF_3NS$: C, 55.89; H, 3.81; S, 9.33. Found: C, 55.96; H, 4.15; S, 9.26.

Example 3

10-(2-chloroethyl)-4-trifluoromethylphenothiazine was prepared from 28.19 g. (0.11 mole) of 4-trifluoromethylphenothiazine, 27.8 g. (0.12 mole) of 2-chloroethyl p-toluenesulfonate, 1.6 g. (0.2 mole) of lithium wire and 15.9 g. (0.12 mole) of n-butyl bromide according to the manipulative procedure described above in Example 1. The crude product was eluted from the alumina column with 6.8 liters of 1:3 solution of benzene and hexane. Evaporation of the solvent gave the crude product which was recrystallized twice from hexane to give 11.5 g. of 10-(2-chloroethyl)-4-trifluoromethylphenothiazine, M.P. 84.4–85° C. (corr.).

Analysis.—Calcd. for $C_{15}H_{11}ClF_3NS$: Cl, 10.77; S, 9.72. Found: Cl, 10.65; S, 9.80.

Example 4

10-(3-chloropropyl)-4-trifluoromethylphenothiazine was prepared from 24.1 g. (0.09 mole) of 4-trifluoromethylphenothiazine, 27.4 g. (0.11 mole) of 3-chloropropyl p-toluenesulfonate, 1.4 g. (0.2 mole) of lithium wire and 13.7 g. (0.10 mole) of n-butyl bromide according to the manipulative procedure described above in Example 1. The product was eluted from the alumina column with 3.5 liters of hexane. The solvent was evaporated to give the crude product which was recrystallized twice from hexane affording 9.9 g. of 10-(3-chloropropyl)-4-trifluoromethylphenothiazine, M.P. 65.4–68.4° C. (corr.).

*Analysis.*—Calcd. for $C_{16}H_{13}ClF_3NS$: C, 55.95; H, 3.81; S, 9.32. Found: C, 56.12; H, 3.98; S, 9.48.

PREPARATION OF FINAL PRODUCTS

*Example 5.—10-[2-(4-hydroxy-1-piperidyl)ethyl]-2-trifluoromethylphenothiazine*

[I; Y is $(CH_2)_2$, Z is S, R is 4-OH]

A mixture of 6.6 g. (0.02 mole) of 10-2-chloroethyl)-2-trifluoromethylphenothiazine, 2.2 g. (0.02 mole) of 4-hydroxypiperidine and 8.3 g. (0.06 mole) of anhydrous potassium carbonate in 200 ml. of n-butanol was refluxed for forty-eight hours. The cooled reaction mixture was filtered, the solid inorganic salts were washed with n-butanol, and the combined filtrate and washings were concentrated to dryness. The residue was dissolved in benzene, and the benzene solution was extracted with water and dilute mineral acid. The acid extracts were basified with ammonium hydroxide and extracted with methylene dichloride. The combined extracts were washed with water, dried over calcium sulfate and concentrated. The residue was dissolved in ether and treated with an ether solution of ethanesulfonic acid. The crude ethanesulfonate which separated was collected and recrystallized several times from ethyl acetate-ether to give 2.2 g. of 10-[2-(4-hydroxy-1-piperidyl)ethyl]-2-trifluoromethylphenothiazine ethanesulfonate, M.P. 92.0–95.0° C. (corr.).

*Analysis.*—Calcd. for $C_{20}H_{21}F_3N_2OS \cdot C_2H_5SO_3H$: C, 52.33; H, 5.39; S, 12.70. Found: C, 51,99; H, 5.44; S, 12.50.

10 - [2 - (4 - hydroxy-1-piperidyl)ethyl]-2-trifluoromethylphenothiazine can be reacted with hydrobromic acid, hydriodic acid, sulfuric acid, phosphoric acid, acetic acid, citric acid, tartaric acid, quinic acid, methyl iodide, methyl bromide, ethyl bromide, allyl bromide, benzyl chloride, 2-chlorobenzyl chloride, or methyl p-toluenesulfonate to give the hydrobromide, hydriodide, sulfate (or bisulfate), phosphate (or acid phosphate), acetate, citrate (or acid citrate), tartrate (or bitartrate), quinate, methiodide, methobromide, ethobromide, allobromide, benzochloride, 2-chlorobenzochloride, or metho-p-toluenesulfonate salts, respectively.

*Example 6*

10 - [3 - (4 - hydroxy-1-piperidyl)propyl]-2-trifluoromethyl]phenothiazine [I; Y is $(CH_2)_3$, Z is S, R is 4-OH] was prepared from 7.6 g. (0.022 mole) of 10-(3-chloropropyl)-2-trifluoromethylphenothiazine, 2.4 g. (0.024 mole) of 4-hydroxy-piperidine and 4.0 g. (0.038 mole) of sodium carbonate in 200 ml. of ethanol according to the manipulative procedure described above in Example 5. The product was isolated in the form of the free base and recrystallized from an ethyl acetate-hexane mixture giving 4.6 g. of 10-[3-(4-hydroxy-1-piperidyl)-propyl]-2-trifluoromethylphenothiazine, M.P. 111.0–114.4° C. (corr.).

*Analysis.*—Calcd. for $C_{21}H_{23}F_3N_2OS$: C, 61.74; H, 5.67; N, 6.86. Found: C, 62.09; H, 5.79; N, 6.79.

10 - [3 - (4 - hydroxy - 1 - piperidyl)propyl] - 2 - trifluoromethylphenothiazine, when administered subcutaneously to mice produced strong potentiation of the hexobarbital sleeping time, its activity being about four times that of chlorpromazine. The effective dose, $ED_{50}$, of 10-[3-(4-hydroxy-1-piperidyl)propyl]-2-trifluoromethylphenothiazine in inducing sleep in mice to which 40 mg./kg. of hexobarbital was administered was 0.38± 0.06 mg./kg. as compared to 1.55±0.10 mg./kg. for chlorpromazine.

*Example 7.—10-[3-(4-hydroxy-1-piperidyl)propyl]-2-trifluoromethylphenothiazine-5-oxide*

[I; Y is $(CH_2)_3$, Z is SO, R is 4-OH]

By following the manipulative procedure described above in Example 6, and by replacement of the 10-(3-chloropropyl)-2-trifluoromethylphenothiazine used therein by a molar equivalent amount of 10-(3-chloropropyl)-2-trifluoromethylphenothiazine-5-oxide (prepared by oxidation of 10 - (3 - chloropropyl)-2-trifluoromethylphenothiazine with one molar equivalent of hydrogen peroxide in ethanol), there can be obtained 10-[3-(4-hydroxy-1-piperidyl) - propyl] - 2-trifluoromethylphenothiazine-5-oxide.

*Example 8.—10-[3-(4-hydroxy-1-piperidyl)propyl]-2-trifluoromethylphenothiazine-5,5-dioxide*

[I; Y is $(CH_2)_3$, Z is $SO_2$, R is 4-OH]

By following the manipulative procedure described above in Example 6, and by replacement of the 10-(3-chloropropyl)-2-trifluoromethylphenothiazine used therein by a molar equivalent amount of 10-(3-chloropropyl)-2-trifluoromethylphenothiazine-5,5-dioxide (prepared by oxidation of 10-(3-chloropropyl)-2-trifluoromethylphenothiazine with hydrogen peroxide in glacial acetic acid), there can be obtained 10-[3-(4-hydroxy-1-piperidyl)-propyl]-2-trifluoromethylphenothiazine-5,5-dioxide.

*Example 9.—10-[3-(4-hydroxy-2-methyl-1-piperidyl) propyl]-2-trifluoromethylphenothiazine*

[I; Y is $(CH_2)_3$, Z is S, R is 4-OH-2-$CH_3$]

By following the manipulative procedure described above in Example 6, and by replacement of the 4-hydroxy-piperidine used therein by a molar equivalent amount of 4-hydroxy-2-methylpiperidine, there can be obtained 10-[3-(4-hydroxy-2-methyl-1-piperidyl)propyl] - 2-trifluoromethylphenothiazine.

*Example 10.—10-[3-(2,5-dimethyl-4-hydroxy-1-piperidyl) propyl]-2-trifluoromethylphenothiazine*

[I; Y is $(CH_2)_3$, Z is S, R is 4-OH-2,5-di-$CH_3$]

By following the manipulative procedure described above in Example 6 and by replacement of the 4-hydroxy-piperidine used therein by a molar equivalent amount of 2,5-dimethyl-4-hydroxypiperidine, there can be obtained 10 - [3 - (2,5 - dimethyl-4-hydroxy-1-piperidyl)propyl]-2-trifluoromethylphenothiazine.

*Example 11.—10-[3-(2,2-dimethyl-4-hydroxy-1-piperidyl) propyl]-2-trifluoromethylphenothiazine*

[I; Y is $(CH_2)_3$, Z is S, R is 4-OH-2,2-di-$CH_3$]

By following the manipulative procedure described above in Example 6 and by replacement of the 4-hydroxy-piperidine used therein by a molar equivalent amount of 2,2-dimethyl-4-hydroxy-piperidine, there can be obtained 10 - [3 - (2,2 - dimethyl-4-hydroxy-1-piperidyl)propyl]-2-trifluoromethylphenothiazine.

*Example 12.—10-[3-(4-hydroxy-2,3,5,6-tetramethyl-1-piperidyl)propyl]-2-trifluoromethylphenothiazine*

(I; Y is $(CH_2)_3$, Z is S, R is 4-OH-2,3,5,6-tetra-$CH_3$]

By following the manipulative procedure described above in Example 6 and by replacement of the 4-hydroxy-piperidine used therein by a molar equivalent amount of 4-hydroxy-2,3,5,6-tetramethylpiperidine, there can be obtained 10-[3 - (4 - hydroxy-2,3,5,6-tetramethyl-1-piperidyl)propyl]-2-trifluoromethylphenothiazine.

*Example 13*

10 - [4 - (4-hydroxy-1-piperidyl)butyl]-2-trifluoromethylphenothiazine [I; Y is $(CH_2)_4$, Z is S, R is 4-OH] was prepared fro 7.16 g. (0.02 mole) of 10-(4-chlorobutyl)-2-trifluoromethylphenothiazine, 2.22 g. (.022 mole) of 4- hydroxypiperidine and 8.30 g. (.06 mole) of anhydrous potassium carbonate in 200 ml. of n-butanol according to the manipulative procedure described above in Example 5. The product was isolated in the form of the free base and recrystallized from hexane to give 5.29 g. of 10-[4-(4 - hydroxy - 1-piperidyl)butyl]-2-trifluoromethylphenothiazine, M.P. 80.2–82.4° (corr.).

*Analysis.*—Calcd. for $C_{22}H_{25}F_3N_2OS$: C, 62.50; H, 5.96; S, 7.60. Found: C, 62.77; H, 6.00; S, 7.67.

*Example 14*

10 - [2-(4-hydroxymethyl-1-piperidyl)ethyl]-2-trifluoromethylphenothiazine [; Y is $(CH_2)_2$, Z is S, R is 4-$CH_2OH$] was prepared from 6.6 g. (0.02 mole) of 10-(2-chloroethyl) - 2 - trifluoromethylphenothiazine, 2.54 g. (0.022 mole) of 4-hydroxymethylpiperidine and 8.30 g. (0.06 mole) of anhydrous potassium carbonate in 200 ml. of n-butanol according to the manipulative procedure described above in Example 5. The product was isolated in the form of the free base and recrystallized from an ethyl acetate-hexane mixture giving 4.44 g. of 10-[2-(4 - hydroxymethyl - 1-piperidyl)ethyl]-2-trifluoromethylphenothiazine, M.P. 130.6–132.8° C. (corr.).

*Analysis.*—Calcd. for $C_{21}H_{23}F_3N_2OS$: C, 61.55; H, 5.68; N, 6.85. Found: C, 61.87; H, 5.56; N, 6.78.

*Example 15*

10 - {3 - [4-(2-hydroxyethyl)-1-piperidyl]propyl}-2-trifluoromethylphenothiazine hydrochloride [I; Y is $(CH_2)_3$, Z is S, R is 4-$CH_2CH_2OH$] was prepared from 8.6 g. (0.025 mole) of 10-(3-chloropropyl)-2-trifluoromethylphenothiazine, 4.5 g. (0.027 mole) of 4-(2-hydroxyethyl)piperidine hydrochloride and 6.6 g. (0.06 mole) of sodium carbonate in 200 ml. of ethanol according to the manipulative procedure described above in Example 5. The product was converted to its hydrochloride salt and recrystallized from an isopropanol-ether mixture giving 3.0 g. of 10 - {3-[4-(2-hydroxyethyl)-1-piperidyl]propyl}-2-trifluoromethylphenothiazine hydrochloride, M.P. 163.8–165.0° C. (corr.).

*Analysis.*—Calcd. for $C_{23}H_{27}F_3N_2OS \cdot HCl$: C, 58.40; H, 5.97; S, 6.78. Found: C, 58.42; H, 6.04; S, 6.87.

*Example 16*

10-{4[4-(3-hydroxypropyl)-1 - piperidyl]butyl} - 2 - trifluoromethylphenothiazine [I; Y is $(CH_2)_4$, Z is S, R is 4-$CH_2CH_2CH_2OH$] was prepared from 7.16 g. (0.02 mole) of 10-(4-chlorobutyl)-2-trifluoromethylphenothiazine, 4.37 g. (0.022 mole) of 4-(3-hydroxypropyl)piperidine and 8.30 g. (0.06 mole) of anhydrous potassium carbonate in 200 ml. of n-butanol according to the manipulative procedure described in Example 5. The product was isolated as the free base and recrystallized from hexane giving 6.0 g. of 10-{4-[4-(3-hydroxypropyl)-1-piperidyl]butyl}-2-trifluoromethylphenothiazine, M.P. 85.4–87.2° C. (corr.).

*Analysis.*—Calcd. for $C_{25}H_{31}F_3N_2OS$: C, 64.64; H, 6.72; S, 6.91. Found: C, 64.53; H, 6.98; S, 6.65.

*Example 17.—10-{3-[4-(2-acetoxyethyl)-1-piperidyl]propyl}-2-trifluoromethylphenothiazine hydrochloride*

[I; Y is $(CH_2)_3$, Z is S, R is 4-$CH_2CH_2OCOCH_3$]

A mixture of 1.9 g. (0.004 mole) of 10-{3-[4-(2-hydroxyethyl)-1-piperidyl]propyl}- 2 - trifluoromethylphenothiazine hydrochloride and acetic anhydride (about 20 ml.) was heated on a steam bath for two hours and then allowed to stand for eighteen hours. The excess acetic anhydride was distilled off in vacuo and the residual oil triturated with ether. The resulting solid was filtered, dried and recrystallized once from ethyl acetate and once from an ethyl acetate-ether mixture giving 1.4 g. of 10-{3-[4-(2-acetoxyethyl)-1-piperidyl]propyl}-2 - trifluoromethylphenothiazine hydrochloride, M.P. 139.4–142.0° C. (corr.).

*Analysis.*—Calcd. for $C_{25}H_{29}F_3N_2O_2S \cdot HCl$: C, 58.30; H, 5.87; S, 6.23; Cl, 6.88. Found: C, 58.18; H, 5.91; S, 6.34; Cl, 6.73.

*Example 18.—10-{3-[4-(2-formyloxyethyl)-1-piperidyl]propyl}-2-trifluoromethylphenothiazine hydrochloride*

[I; Y is $(CH_2)_3$, Z is S, R is 4-$CH_2CH_2OCOH$]

By following the manipulative procedure described above in Example 17 and by adding formic acid to the reaction mixture, there can be obtained 10-{3-[4-(2-formyloxyethyl) - 1 - piperidyl]propyl} - 2 - trifluoromethyldrochloride.

*Example 19.—10-{3-[4-(2-butyryloxyethyl)-1-piperidyl]propyl}-2-trifluoromethylphenothiazine hydrochloride*

[I; Y is $(CH_2)_3$, Z is S, R is 4-$CH_2CH_2OCOC_3H_7$]

By following the manipulative procedure described above in Example 17 and by replacement of the acetic anhydride used therein by a molar equivalent amount of butyryl chloride and a molar equivalent amount of pyridine, there can be obtained 10-{3-[4-(2-butyryloxyethyl)-1-piperidyl]propyl} - 2 - trifluoromethylphenothiazine hydrochloride.

*Example 20.—10-{3-[4-(2-benzoyloxyethyl)-1-piperidyl]propyl}-2-trifluoromethylphenothiazine hydrochloride*

[I; Y is $(CH_2)_3$, Z is S, R is 4-$CH_2CH_2OCOC_6H_5$]

By following the manipulative procedure decsribed above in Example 17 and by replacement of the acetic anhydride used therein by a molar equivalent amount of benzoyl chloride and a molar equivalent amount of pyridine, there can be otbained 10-{3-[4-(2-benzoyloxyethyl)-1-piperidyl]propyl} - 2 - trifluoromethylphenothiazine hydrochloride.

*Example 21.—10-{3-[4-(2-cinnamoyloxyethyl)-1 - piperidyl]propyl}-2-trifluoromethylphenothiazine hydrochloride*

[I; Y is $(CH_2)_3$, Z is S, R is 4-$CH_2CH_2OCOCH=CHC_6H_5$]

By following the manipulative procedure described above in Example 17 and by replacement of the acetic anhydride used therein by a molar equivalent amount of cinnamoyl chloride and a molar equivalent amount of pyridine, there can be obtained 10-{3-[4-(2-cinnamoyloxyethyl)-1-piperidyl]propyl} - 2 - trifluoromethylphenothiazine hydrochloride.

*Example 22.—10-<3-{4-[2-(1 - cyclohexenoyloxyethyl)]-1-piperidyl}propyl>-2-trifluoromethylphenothiazine hydrochloride*

[I; Y is $(CH_2)_3$, Z is S, R is 4-$CH_2CH_2OCOC_6H_9$]

By following the manipulative procedure described above in Example 17 and by replacement of the acetic anhydride used therein by a molar equivalent amount of 1-cyclohexenoyl chloride and a molar equivalent amount of pyridine, there can be obtained 10-<3-{4-[2-(1-cyclohexenoyloxyethyl)]-1 - piperidyl}-propyl> - 2 - trifluoromethylphenothiazine hydrochloride.

*Example 23.—10-{3-[4-(2-acryloyloxyethyl)-1-piperidyl]propyl}-2-trifluoromethylphenothiazine hydrochloride*

[I; Y is $(CH_2)_3$, Z is S, R is 4-$CH_2CH_2OCOCH=CH_2$]

By following the manipulative procedure described above in Example 17 and by replacement of the acetic anhydride used therein by a molar equivalent amount of acryloyl chloride and a molar equivalent amount of pyridine, there can be obtained 10-{3-[4-(2-acryloyloxyethyl)-1-piperidyl]propyl} - 2 - trifluoromethylphenothiazine hydrochloride.

*Example 24*

10-{2-[4-(3-hydroxypropyl) - 1 - piperidyl]ethyl}-4-trifluoromethylphenothiazine [I; Y is $(CH_2)_2$, Z is S, R is 4-$CH_2CH_2CH_2OH$] was prepared from 6.6 g. (0.02 mole)

of 10-(2-chloroethyl)-4-trifluoromethylphenothiazine, 4.47 g. (0.022 mole) of 4-(3-hydroxypropyl)piperidine and 8.30 g. (0.06 mole) of anhydrous potassium carbonate in 200 ml. of n-butanol according to the manipulative procedure described above in Example 5. The product was isolated as the free base and recrystallized from hexane giving 5.11 g. of 10-{2-[4-(3-hydroxypropyl)-1-piperidyl]-ethyl}-4-trifluoromethylphenothiazine, M.P. 86.8–89.6° C. (corr.).

Analysis.—Calcd. for $C_{23}H_{27}F_3N_2OS$: C, 63.20; H, 6.23; S, 7.34. Found: C, 63.34; H, 6.00; S, 7.25.

*Example 25*

10-{2-[4-(3-hydroxypropyl)-1-piperidyl]ethyl}-4-trifluoromethylphenothiazine hydrochloride [I; Y is $(CH_2)_3$, Z is S, R is 4-$CH_2CH_2CH_2OH$] was prepared from 6.88 g. (0.02 mole) of 10-(3-chloropropyl)-4-trifluoromethylphenothiazine, 4.47 g. (0.022 mole) of 4-(3-hydroxypropyl)piperidine and 8.30 g. (0.06 mole) of anhydrous potassium carbonate in 200 ml. of n-butanol according to the manipulative procedure described above in Example 5. The product was converted to the hydrochloride salt and recrystallized from ethyl acetate giving 2.04 g. of 10-{3-[4-(3-hydroxypropyl)-1-piperidyl]propyl}-4-trifluoromethylphenothiazine hydrochloride, M.P. 159.2–162.2° C. (corr.).

Analysis.—Calcd. for $C_{24}H_{29}F_3N_2OS \cdot HCl$: Cl, 7.28; S, 6.58. Found: Cl, 7.50; S, 6.30.

*Example 26*

10-{3-[4-(3-hydroxypropyl)-1-piperidyl]propyl}-2-trifluoromethylphenothiazine hydrochloride [I; Y is $(CH_2)_3$, Z is S, R is 4-$CH_2CH_2CH_2OH$] was prepared from 6.9 g. (0.02 mole) of 10-(3-chloropropyl)-2-trifluoromethylphenothiazine and 4.5 g. (0.022 mole) of 4-(3-hydroxypropyl)piperidine and 5.4 g. (0.051 mole) of sodium carbonate in 200 ml. of ethanol according to the manipulative procedure described above in Example 5. The product was converted to the hydrochloride salt and recrystallized from an isopropanol-ether mixture giving 4.9 g. of 10-{3-[4-(3-hydroxypropyl)-1-piperidyl]propyl}-2-trifluoromethylphenothiazine hydrochloride, M.P. 186.0–192.6° C. (corr.).

Analysis.—Calcd. for $C_{24}H_{29}F_3N_2OS \cdot HCl$: C, 59.19; H, 6.21; N, 5.75. Found: C, 59.51; H, 6.04; N, 5.70.

10-{3-[4-(3-hydroxypropyl)-1-piperidyl]propyl}-2-trifluoromethylphenothiazine hydrochloride was found to be about three times as active as chlorpromazine in potentiating hexobarbital in mice.

*Example 27.—10-[3-(2-hydroxymethyl-1-piperidyl) propyl]-2-trifluoromethylphenothiazine*

[I; Y is $(CH_2)_3$, Z is S, R is 2-$CH_2OH$]

By following the manipulative procedure described above in Example 6 and by replacement of the 4-hydroxypiperidine used therein by a molar equivalent amount of 2-hydroxymethylpiperidine, there can be obtained 10-[3-(2-hydroxymethyl-1-piperidyl)propyl]-2-trifluoromethylphenothiazine.

*Example 28.—10-{3-[4-(5-hydroxypentyl)-1-piperidyl] propyl}-2-trifluoromethylphenothiazine*

[I; Y is $(CH_2)_3$, Z is S, R is 4-$(CH_2)_5OH$]

By following the manipulative procedure described above in Example 6 and by replacement of the 4-hydroxypiperidine used therein by a molar equivalent amount of 4-(5-hydroxypentyl)piperidine there can be obtained 10-{3-[4-(5-hydroxypentyl)-1-piperidyl]propyl}-2-trifluoromethylphenothiazine.

Pharmacological evaluation of the compounds of the invention in mice and dogs has demonstrated that they possess a variety of depressant actions on the central and autonomic nervous system, the cardiovascular system and the skeletal-muscular system. They lower the blood pressure and antagonize the pressor effects of epinephrine in dogs, they decrease the incidence of vomiting induced by apomorphine in dogs, they lower the rectal temperature in mice, and they potentiate the sleeping time in mice induced by ether, thiopental sodium, or hexobarbital sodium. These results indicate their usefulness as hypotensive agents, antinauseants, antipyretics, and sedatives. The compounds can be prepared for use by dissolving under sterile conditions a salt form of the compounds in water (or an equivalent amount of a non-toxic acid if the free base is used), or in a physiologically compatible aqueous medium such as saline, and stored in ampules for intramuscular injection. Alternatively, they can be incorporated in tablet or capsule form for oral administration. They are formulated and used in the same way as known compounds having similar activities, such as chlorpromazine. The toxicity of the compounds of the invention is of the same order of magnitude as that of chlorpromazine.

I claim:

1. A pharmacologically acceptable acid-addition salt of a compound having the formula

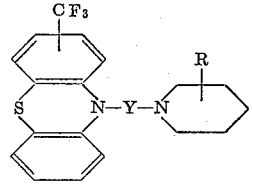

wherein Y represents lower-alkylene containing at least two carbon atoms separating the nitrogen atoms and R represents hydroxy in other than the 2-position.

2. A pharmacologically acceptable acid-addition salt of a compound having the formula

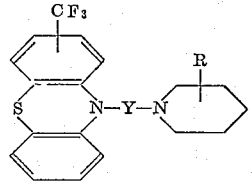

wherein Y represents lower-alkylene containing at least two carbon atoms separating the nitrogen atoms and R represents hydroxy-lower-alkyl.

3. A pharmacologically acceptable acid-addition salt of a compound having the formula

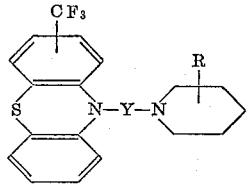

wherein Y represents lower-alkylene containing at least two carbon atoms separating the nitrogen atoms and R represents non-acetylenic hydrocarbon carboxylic acyloxy in other than the 2-position and containing from one to ten carbon atoms.

4. A pharmacologically acceptable acid-addition salt of 10-[3-(4-hydroxy-1-piperidyl)propyl]-2-trifluoromethylphenothiazine.

5. A pharmacologically acceptable acid-addition salt of 10-[4-(4-hydroxy-1-piperidyl)butyl]-2-trifluoromethylphenothiazine.

6. 10-[2-(4-hydroxy-1-piperidyl)ethyl]-2-trifluoromethylphenothiazine ethane-sulfonate.

7. 10-{3-[4-(3-hydroxypropyl)-1-piperidyl]propyl}-2-trifluoromethylphenothiazine hydrochloride.

8. 10-{3-[4-(3-hydroxypropyl)-1-piperidyl]propyl}-4-trifluoromethylphenothiazine hydrochloride.

9. 10-{3-[4-(2-hydroxyethyl)-1-piperidyl]propyl}-2-trifluoromethylphenothiazine hydrochloride.

(References on following page)

References Cited by the Examiner

UNITED STATES PATENTS

| | | | |
|---|---|---|---|
| 2,512,520 | 6/50 | Cusic | 260—243 |
| 2,534,237 | 12/50 | Cusic | 260—243 |
| 2,676,971 | 4/54 | Cusic | 260—243 |
| 2,766,235 | 10/56 | Cusic | 260—243 |
| 2,921,069 | 1/60 | Ullyot | 260—243 |
| 2,926,164 | 2/60 | Cusic et al. | 260—243 |
| 2,928,767 | 3/60 | Gulesich et al. | 260—243 |
| 2,931,810 | 4/60 | Yale et al. | 260—243 |

FOREIGN PATENTS 551,400  3/57  Belgium.
1,212,031  10/59  France.

OTHER REFERENCES

Craig et al., J. Org. Chem., vol. 22, pp. 709–711 (June 1957).

WALTER A. MODANCE, *Primary Examiner.*

HERBERT J. LIDOFF, IRVING MARCUS, DUVAL T. McCUTCHEN, *Examiners.*

UNITED STATES PATENT OFFICE
CERTIFICATE OF CORRECTION

Patent No. 3,193,549                                July 6, 1965

Bernard L. Zenitz

It is hereby certified that error appears in the above numbered patent requiring correction and that the said Letters Patent should read as corrected below.

Column 3, line 27, for "basis" read -- bases --; column 5, line 15, for "10-2-chloroethyl)-" read -- 10-(2-chloroethyl)- --; lines 61 and 62, for "-piperidyl)-propyl]-" read -- -piperidyl)propyl]- --; column 6, line 13, for "piperidyl)-propyl]-" read -- piperidyl)propyl]- --; column 7, line 12, for "[; Y is" read -- [I; Y is --; line 45, for "10-{4[4-" read -- 10-{4-[4- --.

Signed and sealed this 8th day of February 1966.

(SEAL)
Attest:

ERNEST W. SWIDER
Attesting Officer

EDWARD J. BRENNER
Commissioner of Patents